United States Patent [19]
Tontini

[11] 3,726,091
[45] Apr. 10, 1973

[54] SOUND SUPPRESSING APPARATUS
[75] Inventor: Remo Tontini, San Diego, Calif.
[73] Assignee: Rohr Corporation, Chula Vista, Calif.
[22] Filed: Feb. 16, 1971
[21] Appl. No.: 115,246

[52] U.S. Cl............60/264, 181/33 HC, 239/265.17
[51] Int. Cl.....................F02k 11/00, F01n 1/00
[58] Field of Search....................60/264, 265, 262; 181/33 HC; 239/127.3, 265.17

[56] References Cited

UNITED STATES PATENTS

| | | | |
|---|---|---|---|
| 3,333,772 | 8/1967 | Bruner | 181/33 HC |
| 3,393,518 | 7/1968 | Bridge | 60/264 |
| 3,463,402 | 8/1969 | Langston | 181/33 HC |
| 3,527,317 | 9/1970 | Motsinger | 181/33 HC |
| 3,579,993 | 5/1971 | Tanner | 60/264 |

*Primary Examiner*—Douglas Hart
*Attorney*—George E. Pearson

[57] ABSTRACT

Engine of either turbo fan or turbo jet type is provided with multiple lobed exhaust nozzle. An ejector barrel defining a mixing zone is connected at its leading edge to the lobe tips adjacent to the nozzle exit plane to receive engine gases and free stream air. A plenum chamber in the forward portion of the barrel has inlet ports in flow communication with tip portions of lobes, and guide vanes extend forward into lobes to split the mixed engine gases and guide outer streams into plenum chamber inlet ports while inner streams flow directly to mixing zone. An annular exhaust slot is formed at the aft end of the plenum chamber to discharge high pressure gas into the intermediate section of the mixing zone. A plurality of control valve plates extend around the periphery of the slot and are individually controlled to open all or any part of the slot. When lower plates are open, the slot discharges an elongate stream of high pressure gas in the form of a trough-shaped shield to surround lower part of propulsion stream and reflect sound waves upward. Valves at one side may be opened to shield fuselage from noise. When all valves are opened, a complete gas sleeve is formed around the propulsion stream and improves thrust in addition to sound suppression. Gas for slot may be taken from turbine tail pipe for increased temperature. When air is used, afterburner may be employed to produce even higher temperature to enhance the reflective effectiveness of the shield.

17 Claims, 4 Drawing Figures

INVENTOR.
REMO TONTINI

INVENTOR.
REMO TONTINI
BY
George E. Pearson
ATTORNEY

SOUND SUPPRESSING APPARATUS

BACKGROUND OF THE INVENTION

This invention lies in the field of sound suppression of gas turbine or jet engines, which produce reaction thrust by ejecting a high velocity stream of gas rearward from the exhaust nozzle or tail pipe of the gas turbine. One of the problems of airplanes equipped with jet engines on which a great deal of effort has been expended is that the exhaust stream creates a very high level of sound energy or "noise" in a wide range of frequencies, and a portion of this noise reaches the ground from low flying airplanes, as during takeoff and climb, at an energy level which is not acceptable to the public.

The invention is directed to a system in which that portion of the noise which produces objectionable effects at ground level is largely prevented from being emitted downward while no control is exercised over the noise which is radiated upward. It is directed particularly to a system which acts to reflect the objectionable noise upward and which will function just as effectively with a simple nozzle as with one which is equipped with other sound suppression devices. It is further directed to a system in which the noise may be reflected in any selected direction, such as away from the cabin of a passenger airplane. Various schemes have been proposed which make use of sound reflection to some extent but they have generally been unsatisfactory because of weight, complication, first cost, or minimal noise reduction.

SUMMARY OF THE INVENTION

The present invention provides a very satisfactory solution to the problem with a limited amount of equipment and very few moving parts requiring repair, maintenance, or adjustment. Generally stated, it may be applied to any type of jet engine with any type of exhaust nozzle, but the presently preferred embodiment is applied to a fan jet engine having a lobed nozzle to receive fan air and turbine gases, and an ejector ring attached to the nozzle to serve as a mixing chamber for the engine gases and free stream air.

An exhaust slot is formed in the intermediate section of the inner wall of the ejector barrel to discharge high pressure gas rearwardly along the surface of the inner wall. The slot extends around the periphery of the inner wall and a plurality of discrete valve plates control the opening of various sections of the slot. When noise suppression is called for in the case of takeoff or climb, all or some of the valve plates for controlling the slot are opened and the remainder of those not opened are closed. Gas will now issue from the open segment of the slot and will form either a complete sleeve or an elongate, trough-shaped, concave gaseous shield extending rearward of the ejector barrel and surrounding the propulsion stream or a selected portion thereof and will serve to reflect internally or in a selected direction a substantial portion of the sound waves in the stream. It will also serve to refract some of the sound waves passing through it to angles closer to the axis of the engine, thus reducing the angle of the noise cone which increases the attenuation.

An important feature of the invention is that, since the valve plates are all individually controlled, the slot may be used in its entirety or a slot segment may be effectively rotated to any desired position around the periphery to produce the noise reflection in any desired direction. This may be used to reduce the sound level in a passenger cabin or to shield one side of an airport which is heavily populated when the other side is relatively vacant. In cruising flight, the entire slot may be opened to a regulated extent to modify the effective profile of the ejector barrel and improve thrust.

The supply of gas for the slot may be primarily fan air or primarily turbine gas if a higher temperature shield is desired. To produce the maximum shield temperature, fan air may be used in conjunction with a special afterburner. The shield accomplishes its functions because of the difference in the velocity of sound between the hot gases of the shield and the relatively cooler gases of the ejector mixed flow, the speed of sound being a function of temperature. Thus, the hotter the gas in the shield, the more effective it will be.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENTS

Figure 1:
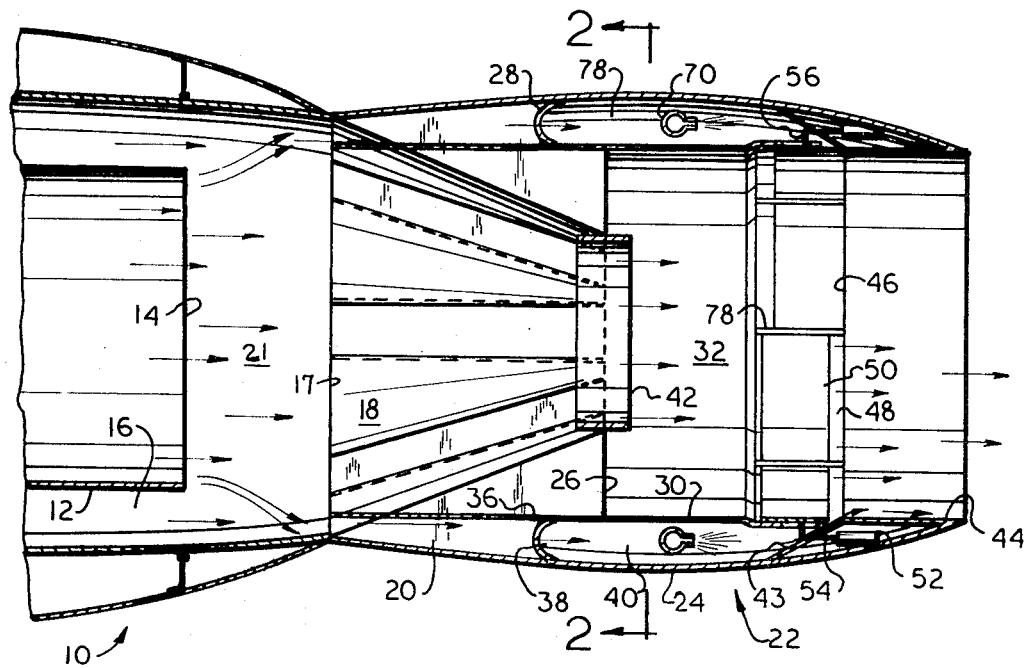
FIG. 1 is a schematic longitudinal sectional view of the apparatus of the invention.

The general arrangement illustrated in FIG. 1 shows the apparatus incorporated in a typical fan jet engine installation. An engine, not shown, is mounted within a nacelle or housing 10 and is provided with a tail pipe 12 having a trailing edge 14. The tail pipe is radially spaced from the housing to define a passage 16 for bypass fan airflow, the trailing edge 17 of passage 16 being disposed downstream from the trailing edge 14 of the tail pipe to provide a zone 21 for mixing of the turbine gases with fan air. The passage 16 exits into lobed nozzle 18 having a plurality of radially and axially directed lobes 20, in which the gases from the turbine and the bypass fan air further mix to some extent.

An ejector barrel 22 is arranged coaxially of the engine and has an outer wall 24 joined to the nozzle at its trailing edge 26 where it is welded or otherwise secured to the outer aft edges of lobes 20. Between the lobes, the leading edge 28 is rounded and reversely bent to form the inner wall 30 of the barrel, which internally thereof defines a mixing zone 32. The spaces between the lobes define valleys 34 converging rearwardly to form inflow paths for free stream air to enter zone 32 and mix with the gases from the engine. Within each lobe, the inner wall 30 is extended forward to form a vane 36 which splits the gases in the lobe and causes the radially outward portion to enter a port 38 leading to a plenum chamber 40; between the inner and outer walls of the barrel. The lobes are attached to a central reinforcing ring 42.

The aft wall 43 of the plenum chamber converges rearwardly to meet the trailing section 44 of the inner wall of the barrel at a peripheral junction line 46. Wall 30 terminates short of the junction line to form a peripheral exhaust slot 48 through which gases in plenum chamber 40 are directed rearwardly therefrom and along the wall 44. The gases under pressure in plenum chamber 40 will flow outward and rearward through the open segments of slot 48. A plurality of control nozzle means in the form of valve plates 50 are mounted to move axially across slot 48 to close it or to regulate the degree of opening. Each valve plate is independent of the others and operable individually by a separate servo motor 52 acting through piston rod 54 and arm 56. Consequently as indicated in FIG. 1, the lower valve plates may be opened while the upper remain closed. The result is an open slot segment around the lower half of the barrel, and high pressure gas issues therefrom to flow along the inner wall of the trailing section and form a trough-shaped, inwardly concave shield of high pressure gas such as the shield 58 indicated in FIG. 4.

Figure 4:
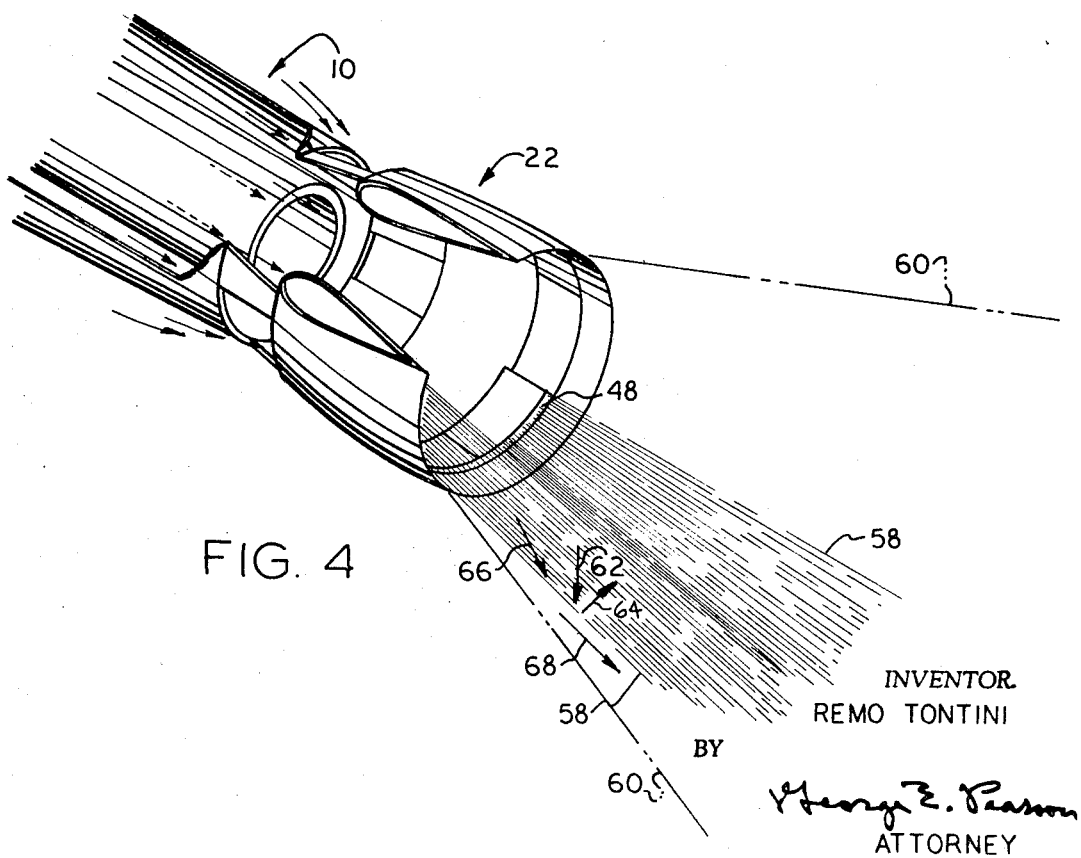
FIG. 4 is a schematic perspective view illustrating the operation of the invention.

Considering FIG. 4, it will be understood that the usual cone of the expansion boundary of the propulsion gas stream will be generally as illustrated at 60 and that the objectionable sound is emitted in a greater cone angle. Since the gaseous shield 58 surrounds the lower half of the propulsion gas stream as it issues from the ejector barrel 22, it will intercept a substantial portion of the sound waves created in the stream and reflect them upwardly, the propagating sound waves and the reflection thereof being indicated respectively by arrows 62 and 64. The sound waves penetrating the shield will be refracted to a smaller cone angle as indicated by arrows 66 and 68 because of the relatively higher temperature of the gas in shield 58.

Returning to FIG. 1, it will be apparent that the gases entering plenum chamber 40 will be primarily fan air. Thus they will be considerably hotter than the mixture of gases in the mixing zone 32 which will include a large quantity of free stream air. In some designs it may be desirable to produce the noise reflector shield 58 with gases which are considerably hotter than the fan air. This may be accomplished by providing a number of afterburners 70 which supply added fuel and burn it with the air in the plenum chamber to furnish the desired additional heat in the gaseous shield 58.

Figure 3:
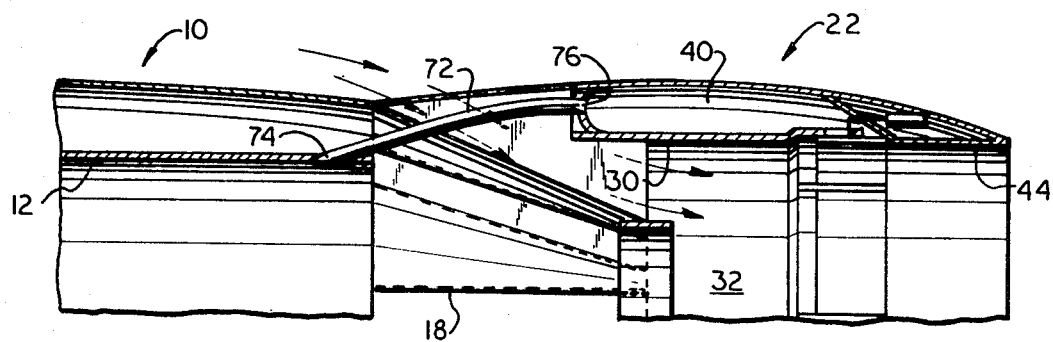
FIG. 3 is a fragmentary schematic longitudinal sectional view of a modification.

If it is desired to provide additional heat without the use of afterburners, the modification of FIG. 3 may be employed. In this form, conduits 72 are provided, with their forward ends 74 in direct flow communication with the interior of tailpipe 12 and their aft ends 76 discharging turbine gases into plenum chamber 40.

Figure 2:
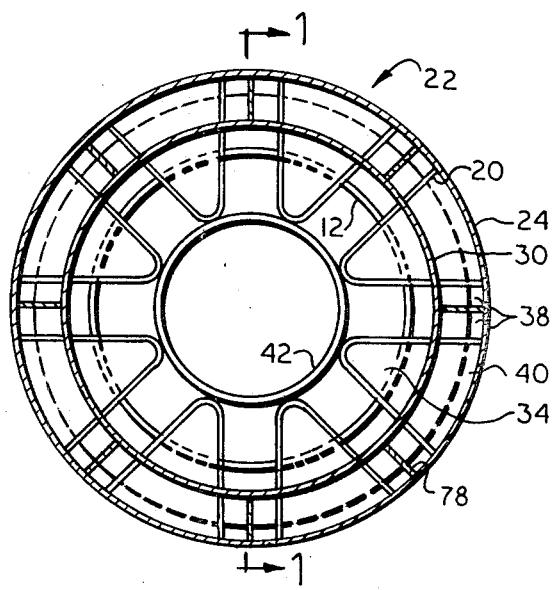
FIG. 2 is a sectional view taken on line 2—2 of FIG. 1.

In some cases it is desirable to provide separate plenum chambers to be controlled individually by the individual valve plates 50. In the form shown, this is accomplished by the provision of a plurality of fore and aft partitions 78 as indicated in FIGS. 1 and 2. The separate plenum chambers may also be individual enclosures with their own separate walls if desired.

As illustrated in FIG. 1, the lower valve plates 50 are open and the upper valve plates are closed to produce a gaseous noise reflector shield below the propulsion stream. If it is desired to shield a passenger cabin against a laterally spaced engine, all of the valve plates on one side, nearer to the cabin, would be opened and those on the opposite side would be closed, producing a noise reflector shield between the cabin and the engine.

In the cruise regime all of the valve plates may be opened to a predetermined extent to modify the effective profile of the ejector barrel in order to achieve optimum thrust.

It will be understood that the invention heretofore disclosed could be used in connection with a conventional turbojet engine as well as with a turbo fan jet engine as disclosed. While the apparatus has been shown in an installation having an attached lobed nozzle as shown in FIG. 1 and a conical nozzle as shown in FIG. 4, it will be apparent that other nozzle configurations may also be used to advantage.

Having thus described the invention, what is claimed as new and useful and is desired to be secured by U. S. Letters Patent is:

1. Sound suppression and thrust augmentation apparatus for use in combination with a jet engine having an exhaust nozzle and an ejector barrel extending aft thereof; said barrel having radially spaced inner and outer walls defining a plenum chamber; inlet path means for the flow of free stream air to mix with the engine gases within the barrel; the inner wall of the barrel defining a mixing zone for the free stream air and the gases issuing from the nozzle; control nozzle means in the barrel extending substantially around the periphery of its inner wall; means to supply gas under pressure to the plenum chamber and thence to the control nozzle means; the latter being effective to discharge a stream of gas rearwardly along the inner wall of the barrel trailing section and selectively around the periphery of the stream to produce an elongate shield of high pressure gas extending rearwardly from the barrel to reflect a substantial portion of the sound waves in the propulsion stream inwardly thereof and to refract a substantial portion of the sound waves passing through it.

2. Apparatus as claimed in claim 1; the means to supply gas to the control nozzle means comprising flow path means opening forwardly into the exhaust nozzle of the engine to receive a portion of the exhaust gases and transmit them to the control nozzle means.

3. Apparatus as claimed in claim 2; the engine being of the fan type and the nozzle containing turbine gas and fan air; and the flow path means being constructed and arranged to receive primarily fan air for transmission to the control nozzle means.

4. Apparatus as claimed in claim 3; and afterburner means located within the flow path means to supply fuel and burn it with the fan air to increase the temperature of the gas transmitted to the control nozzle means.

5. Apparatus as claimed in claim 1; the engine being of the fan type with a turbine tail pipe discharging turbine gases into the exhaust nozzle and a conduit discharging fan air into the exhaust nozzle; and the means to supply gas to the control nozzle means comprising conduits communicating at their forward ends directly with the interior of the turbine tail pipe and at their aft ends discharging turbine gases into the plenum chamber.

6. Apparatus as claimed in claim 1; the means to supply gas to the control nozzle means including said plenum chamber and defining an annular discharge slot around the periphery of the inner wall of the barrel; and the control nozzle means comprising a plurality of discrete control members individually operable to control the extent of opening and closing of selected portions of the discharge slot.

7. Apparatus as claimed in claim 6; the plenum chamber comprising a plurality of individual plenum chambers arranged in peripheral adjacency around the barrel; and one of the control members serving to control the discharge from each of said plenum chambers.

8. Apparatus as claimed in claim 6; each of the control members comprising a plate movable axially to cover and uncover a selected portion of the discharge slot.

9. Sound suppressing apparatus for use in combination with a jet engine having an exhaust nozzle, comprising: a generally annular housing coaxial with the engine and extending rearwardly to receive and control the propulsion gases issuing from the engine; means to define a rearwardly discharging exhaust slot in the inner wall of the housing forward of its trailing edge in a plane transverse to the engine axis and extending around the periphery of the inner wall or selectively around a portion thereof; and means to supply gas under pressure to the exhaust slot to flow rearwardly therefrom along the inner wall of the housing and produce a gaseous shield extending rearwardly from the housing to reflect sound waves in the propulsion gases in a selected direction.

10. Apparatus as claimed in claim 9; the means to supply gas to the exhaust slot comprising flow path means adapted to receive a portion of the propulsion gases at its forward end and transmit them to the exhaust slot.

11. Apparatus as claimed in claim 10; the flow path means being constructed and arranged to receive only turbine gases.

12. Apparatus as claimed in claim 10 and wherein the jet engine is of the fan bypass type and the flow path means being constructed and arranged to receive primarily bypass fan air from the engine.

13. Apparatus as claimed in claim 12; and afterburner means in the flow path means to supply fuel and burn it with the fan air to increase the temperature of the gas transmitted to the exhaust slot and thereby further augment the thrust and increase the reflective effectiveness of the gaseous shield.

14. Apparatus as claimed in claim 9; the means to define the exhaust slot including movable means to close the slot and to control the extent of its opening.

15. Apparatus as claimed in claim 9; the means to define the exhaust slot including movable means to vary the peripheral extent and the location of the slot around the periphery of the inner wall of the housing.

16. An ejector method of suppressing the sound of a jet engine, comprising the steps of discharging the engine gases rearwardly into a zone for mixing with free stream air, producing a peripheral gaseous shield or selectively a trough-shaped portion thereof having high velocity and directing it rearwardly aft of the engine and immediately adjacent to the propulsion stream of mixed air and engine gases to surround the latter and reflect some of the sound waves in the propulsion stream inwardly thereof and to refract other sound waves along the stream.

17. A method as claimed in claim 16; further including varying the location of the shield about the periphery of the propulsion stream to reflect the sound waves in a selected direction.

* * * * *